(12) United States Patent
Fujiwara

(10) Patent No.: US 10,053,561 B2
(45) Date of Patent: Aug. 21, 2018

(54) HOSE RUBBER COMPOSITION AND HYDRAULIC HOSE

(71) Applicant: BRIDGESTONE CORPORATION, Chuo-ku, Tokyo (JP)

(72) Inventor: Yuko Fujiwara, Tokorozawa (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/303,381

(22) PCT Filed: Mar. 13, 2015

(86) PCT No.: PCT/JP2015/001410
§ 371 (c)(1),
(2) Date: Oct. 11, 2016

(87) PCT Pub. No.: WO2015/159482
PCT Pub. Date: Oct. 22, 2015

(65) Prior Publication Data
US 2017/0029603 A1  Feb. 2, 2017

(30) Foreign Application Priority Data
Apr. 16, 2014  (JP) ................. 2014-084394

(51) Int. Cl.
*C08L 9/02* (2006.01)
*F16L 11/04* (2006.01)
*F16L 11/12* (2006.01)

(52) U.S. Cl.
CPC ................. *C08L 9/02* (2013.01); *F16L 11/04* (2013.01); *F16L 11/12* (2013.01); *C08L 2205/025* (2013.01); *C08L 2205/035* (2013.01)

(58) Field of Classification Search
CPC ................. C08L 9/02; C08L 2205/025; C08L 2205/035; F16L 11/04; C08K 3/22; C08K 3/06
See application file for complete search history.

(56) References Cited

U.S. PATENT DOCUMENTS 4,062,812 A * 12/1977 Safford et al. ............ C08L 9/02
252/500
2002/0128139 A1  9/2002 Hashimoto et al.

FOREIGN PATENT DOCUMENTS

| | | |
|---|---|---|
| CN | 102993501 A | 3/2013 |
| EP | 2883908 A1 | 6/2015 |
| JP | S5676438 A | 6/1981 |
| JP | S63218347 A | 9/1988 |
| JP | H02163139 A | 6/1990 |
| JP | H05287121 A | 11/1993 |
| JP | H06137437 A | 5/1994 |
| JP | H0967471 A | 3/1997 |
| JP | H10298350 A | 11/1998 |
| JP | 2002194143 A | 7/2002 |
| JP | 2003128842 A | 5/2003 |
| JP | 2003192834 A | 7/2003 |
| JP | 2004323629 A | 11/2004 |
| JP | 2010121681 A | 6/2010 |
| JP | 2013181085 A | 9/2013 |
| WO | 2014024698 A1 | 2/2014 |

OTHER PUBLICATIONS

Database WPI Week 198842 Thomson Scientific, London, GB; AN 1988-297213 XP002766186, 1988.

* cited by examiner

*Primary Examiner* — Nathan M Nutter
(74) *Attorney, Agent, or Firm* — Kenja IP Law PC

(57) ABSTRACT

A hose rubber composition and hydraulic hose having favorable oil resistance and excellent in cold resistance and manufacturing operability are provided. A hose rubber composition includes, as a rubber component: acrylonitrile-butadiene rubber A whose acrylonitrile content is less than 26%; and acrylonitrile-butadiene rubber B whose acrylonitrile content is 26% or more, wherein a mass ratio of the acrylonitrile-butadiene rubber A and the acrylonitrile-butadiene rubber B is in a range of 15:85 to 45:55.

4 Claims, 1 Drawing Sheet

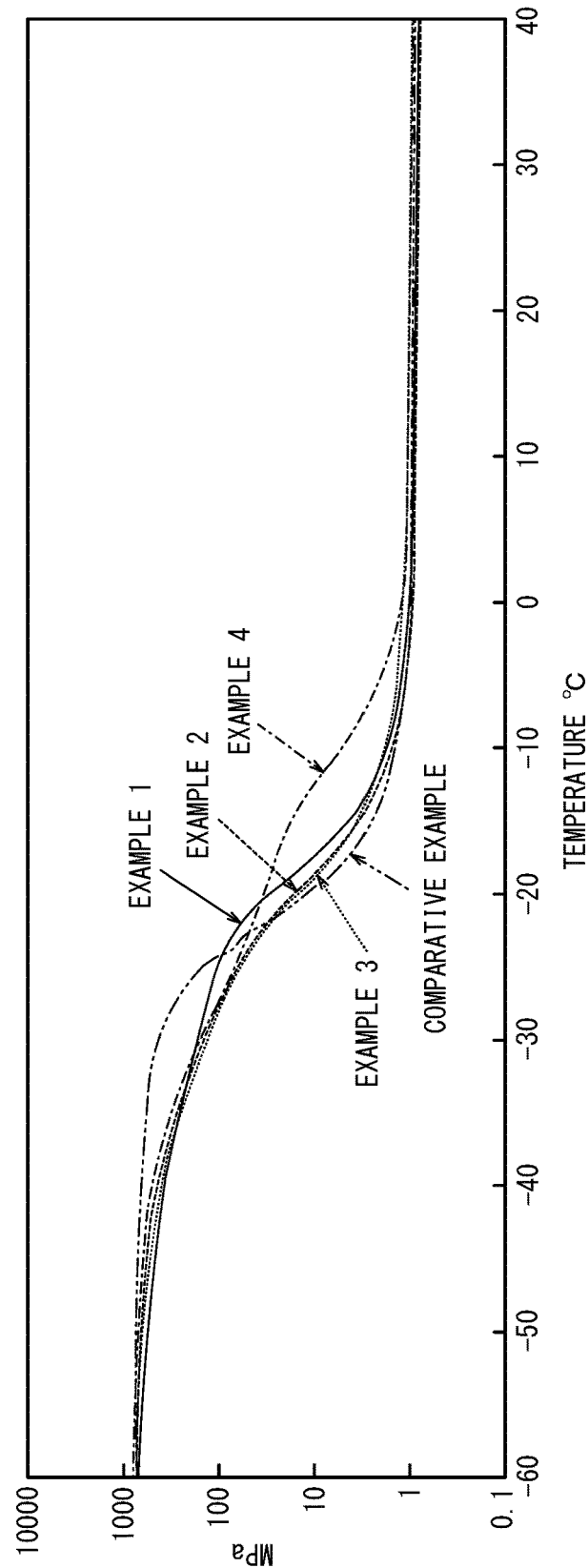

HOSE RUBBER COMPOSITION AND HYDRAULIC HOSE

TECHNICAL FIELD

The disclosure relates to a hose rubber composition and a hydraulic hose, and particularly relates to a hose rubber composition and hydraulic hose having favorable oil resistance and excellent in cold resistance and manufacturing operability.

BACKGROUND

Inner tube rubber of hoses for use in the fields such as construction, engineering, agriculture, and transportation is required to have oil resistance because oil is used as a pressure transmission medium.

To improve oil resistance, a known technique uses acrylonitrile-butadiene rubber as a rubber component as disclosed in Patent Literature (PTL) 1.

CITATION LIST

Patent Literature

PTL 1: JP H5-287121 A

SUMMARY

Technical Problem

However, if the acrylonitrile content in the acrylonitrile-butadiene rubber is high, cold resistance (such as flexibility and strength at low temperature) decreases, although the oil resistance improving effect is high.

Thus, it has conventionally been impossible to achieve both oil resistance and cold resistance at high level. The technique in PTL 1 needs a certain amount of acrylonitrile to enhance oil resistance, which sacrifices cold resistance to some extent.

In hose manufacturing, the hose is braided with brass-plated wires or the like while externally cooling the rubber using liquid nitrogen or the like. Due to a temperature difference of the cooled rubber in the thickness direction, however, the hose cannot be braided uniformly. This needs to be remedied, too.

It could therefore be helpful to provide a hose rubber composition and hydraulic hose having favorable oil resistance and excellent in cold resistance and manufacturing operability, by optimizing the rubber component.

Solution to Problem

As a result of extensive research, we discovered that excellent cold resistance can be achieved while ensuring favorable oil resistance by using, as the rubber component, acrylonitrile-butadiene rubber whose acrylonitrile content is less than 26% and acrylonitrile-butadiene rubber whose acrylonitrile content is 26% or more and limiting the mass ratio of the two types of acrylonitrile-butadiene rubber to a specific range. We also discovered that, since the plurality of types of acrylonitrile-butadiene rubber are mixed, the obtained rubber composition changes more gradually in temperature distribution of viscoelasticity than conventional rubber compositions, thus solving the aforementioned operability problem associated with the temperature difference of the rubber in the thickness direction.

The disclosure is based on these discoveries.

A hose rubber composition includes, as a rubber component: acrylonitrile-butadiene rubber A whose acrylonitrile content is less than 26%; and acrylonitrile-butadiene rubber B whose acrylonitrile content is 26% or more, wherein a mass ratio of the acrylonitrile-butadiene rubber A and the acrylonitrile-butadiene rubber B is in a range of 15:85 to 45:55.

Preferably, the acrylonitrile-butadiene rubber B includes: acrylonitrile-butadiene rubber C whose acrylonitrile content is 26% or more and less than 30%; and acrylonitrile-butadiene rubber D whose acrylonitrile content is 30% or more, and a mass ratio of the acrylonitrile-butadiene rubber A, the acrylonitrile-butadiene rubber C, and the acrylonitrile-butadiene rubber D is in a range of 15-25:40-60:35-45.

More preferably, the acrylonitrile content of the acrylonitrile-butadiene rubber D is 30% or more and 35% or less.

A hydraulic hose uses the hose rubber composition described above.

Advantageous Effect

It is thus possible to provide a hose rubber composition having favorable oil resistance and excellent in cold resistance and manufacturing operability, and a hydraulic hose derived by using the rubber composition.

BRIEF DESCRIPTION OF THE DRAWINGS

In the accompanying drawings:

FIGURE is a graph illustrating the temperature distribution of the viscoelasticity of each sample of Examples and Comparative Example.

DETAILED DESCRIPTION (Hose Rubber Composition)

The following describes one of the disclosed embodiments in detail.

A hose rubber composition includes, as a rubber component, acrylonitrile-butadiene rubber A whose acrylonitrile content is less than 26% and acrylonitrile-butadiene rubber B whose acrylonitrile content is 26% or more.

Acrylonitrile-butadiene rubber (NBR) mentioned here is a copolymer of acrylonitrile (AN) and butadiene, and is expressed by the following structural formula:

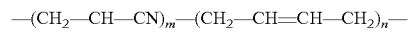

$$-(CH_2-CH-CN)_m-(CH_2-CH=CH-CH_2)_n-$$

The difference between the acrylonitrile-butadiene rubber A and the acrylonitrile-butadiene rubber B is determined based on whether or not the acrylonitrile content (combined acrylonitrile content) is less than 26%.

The mass ratio of the acrylonitrile-butadiene rubber A and the acrylonitrile-butadiene rubber B is in the range of 15:85 to 45:55.

Acrylonitrile-butadiene rubber has higher oil resistance but lower cold resistance when the acrylonitrile content is higher, as mentioned earlier. By limiting the mass ratio of the acrylonitrile-butadiene rubber A and the acrylonitrile-butadiene rubber B to this range, the acrylonitrile-butadiene rubber B ensures oil resistance whereas the acrylonitrile-butadiene rubber A ensures cold resistance. Hence, both oil resistance and cold resistance can be achieved at high level.

Acrylonitrile-butadiene rubber also has a property of suddenly changing in viscoelasticity in a certain temperature range, depending on the acrylonitrile content. Such a sudden viscoelasticity change can be suppressed by mixing the two types of acrylonitrile-butadiene rubber in an appropriate range. This reduces a change in viscoelasticity caused by the temperature difference of the cooled rubber in the thickness direction in hose manufacturing, and improves manufacturing operability.

In the case where the mass ratio of the acrylonitrile-butadiene rubber A and the acrylonitrile-butadiene rubber B is not in the aforementioned range, the advantageous effects cannot be attained.

In the case where the mass ratio of the acrylonitrile-butadiene rubber A to the acrylonitrile-butadiene rubber B is less than 15:85, sufficient cold resistance cannot be achieved. In the case where the mass ratio of the acrylonitrile-butadiene rubber A to the acrylonitrile-butadiene rubber B is more than 45:55, sufficient oil resistance cannot be ensured.

Preferably, the acrylonitrile-butadiene rubber B includes acrylonitrile-butadiene rubber C whose acrylonitrile content is 26% or more and less than 30% and acrylonitrile-butadiene rubber D whose acrylonitrile content is 30% or more, and the mass ratio of the acrylonitrile-butadiene rubber A, the acrylonitrile-butadiene rubber C, and the acrylonitrile-butadiene rubber D is in the range of 15-25:40-60:35-45.

By separating the acrylonitrile-butadiene rubber B into two types of acrylonitrile-butadiene rubber, the acrylonitrile content can be controlled more finely, with it being possible to achieve both oil resistance and cold resistance at higher level. In the case where the mass ratio of these types of acrylonitrile-butadiene rubber is not in the aforementioned range, desired oil resistance or cold resistance may not be attained.

The acrylonitrile content of the acrylonitrile-butadiene rubber D is more preferably 30% or more and 35% or less. In the case where the acrylonitrile content of the acrylonitrile-butadiene rubber D is more than 35%, a problem of polymer compatibility may arise. Besides, such acrylonitrile-butadiene rubber suddenly changes in viscoelasticity depending on temperature, which may cause lower manufacturing operability of the rubber composition.

Whether or not the rubber component includes a plurality of types of acrylonitrile-butadiene rubber and how much acrylonitrile is contained in each type of acrylonitrile-butadiene rubber can be, for example, determined by measuring the temperature distribution of the viscoelasticity of the rubber composition and analyzing the distribution of the nitrile group, although these are not limitations.

The method of producing the acrylonitrile-butadiene rubber is not particularly limited. For example, the acrylonitrile-butadiene rubber may be obtained by emulsion-polymerizing acrylonitrile and butadiene and solidifying and drying them, or by purchasing a commercial product.

Other components in the rubber component are not particularly limited. The rubber component may be composed of only the aforementioned plurality of types of acrylonitrile-butadiene rubber, or contain other rubber depending on the use of the hose. Even in the case where other rubber is contained, the advantageous effects can be attained by mixing the plurality of types of acrylonitrile-butadiene rubber in the aforementioned range.

Components of the rubber composition other than the rubber component are not particularly limited. Depending on the use of the hose, compounding agents typically used in the rubber industry, such as age resistor, softener, silane coupling agent, stearic acid, zinc oxide, vulcanization accelerator, and vulcanizing agent, may be selected as appropriate and mixed within the range that does not interfere with the object of the disclosure. Commercial products may be suitably used as these compounding agents. The rubber composition can be produced by mixing the rubber component with each type of compounding agent selected as appropriate when necessary, and kneading, warming, extruding, etc. the mixture.

(Hydraulic Hose)

A hydraulic hose is manufactured by using the rubber composition described above. In particular, the rubber composition is preferably used as inner tube rubber. The use of the rubber composition as inner tube rubber not only achieves both oil resistance and cold resistance but also has an excellent effect in manufacturing operability.

The hydraulic hose is not particularly limited as long as the rubber composition described above is used in any of the hydraulic hose members, and may be manufactured according to an ordinary method.

EXAMPLES

The disclosed techniques are described in more detail below using examples, although the disclosure is not limited to these examples.

(Acrylonitrile-Butadiene Rubber)

The following types of acrylonitrile-butadiene rubber were prepared.

TABLE 1

| Name | Acrylonitrile content (%) |
| --- | --- |
| Acrylonitrile-butadiene rubber 1 (high nitrile) | 41 |
| Acrylonitrile-butadiene rubber 2 (intermediate-high nitrile) | 35 |
| Acrylonitrile-butadiene rubber 3 (intermediate nitrile) | 29 |
| Acrylonitrile-butadiene rubber 4 (intermediate nitrile) | 26 |
| Acrylonitrile-butadiene rubber 5 (low nitrile) | 20 |

The information of each of acrylonitrile-butadiene rubbers 1 to 5 is given below.

Acrylonitrile-butadiene rubber 1: "N220S" made by JSR Corporation

Acrylonitrile-butadiene rubber 2: "N230S" made by JSR Corporation

Acrylonitrile-butadiene rubber 3: "Nipol DN306" made by Nippon Zeon Co., Ltd.

Acrylonitrile-butadiene rubber 4: "N240S" made by JSR Corporation

Acrylonitrile-butadiene rubber 5: "N250S" made by JSR Corporation

Examples 1 to 4, Comparative Example

Each rubber composition was prepared as shown in Table 2. The unit of content "phr" is the ratio (parts by mass) to 100 parts by mass the rubber component.

TABLE 2

|  |  | Example 1 | Example 2 | Example 3 | Example 4 | Comparative Example |
|---|---|---|---|---|---|---|
| Acrylonitrile-butadiene rubber 1 | Content | — | — | — | 35 | — |
| Acrylonitrile-butadiene rubber 2 | (phr) | 55 | 35 | 45 | — | — |
| Acrylonitrile-butadiene rubber 3 |  | — | — | — | — | 100 |
| Acrylonitrile-butadiene rubber 4 |  | — | 40 | 40 | 40 | — |
| Acrylonitrile-butadiene rubber 5 |  | 45 | 25 | 15 | 25 | — |
| Sulfur |  | 2 | 2 | 2 | 2 | 2 |
| Vulcanization accelerator* |  | 2 | 2 | 2 | 2 | 2 |
| Zinc oxide |  | 5 | 5 | 5 | 5 | 5 |

*"NOCCELER DM-P" made by Ouchi Shinko Chemical Industrial Co., Ltd., di-2-benzothiazolyl disulfide <Evaluation>

Each rubber composition was vulcanized under normal conditions, and then the temperature distribution of viscoelasticity was measured using a viscoelasticity meter (made by Rheometrics Inc.). The FIGURE illustrates the measurement results.

As can be seen from the FIGURE, the samples of Examples 1 to 4 gradually changed in viscoelasticity, and had low viscoelasticity up to about −40° C., as compared with the sample of Comparative Example. This indicates excellent cold resistance and low-temperature operability of the samples of Examples 1 to 4.

INDUSTRIAL APPLICABILITY

Thus, a hose rubber composition having favorable oil resistance and excellent in cold resistance and manufacturing operability can be provided. A hydraulic hose derived by using such a rubber composition is industrially useful as both oil resistance and cold resistance can be achieved at high level.

The invention claimed is:

1. A hose rubber composition comprising, as a rubber component:
   acrylonitrile-butadiene rubber A whose acrylonitrile content is less than 26%; and
   acrylonitrile-butadiene rubber B whose acrylonitrile content is 26% or more,
   wherein a mass ratio of the acrylonitrile-butadiene rubber A and the acrylonitrile-butadiene rubber B is in a range of 15:85 to 45:55,
   the acrylonitrile-butadiene rubber B includes: acrylonitrile-butadiene rubber C whose acrylonitrile content is 26% or more and less than 30%; and acrylonitrile-butadiene rubber D whose acrylonitrile content is 30% or more, and
   a mass ratio of the acrylonitrile-butadiene rubber A, the acrylonitrile-butadiene rubber C, and the acrylonitrile-butadiene rubber D is in a range of 15-25:40-60:35-45.

2. The hose rubber composition according to claim 1, wherein the acrylonitrile content of the acrylonitrile-butadiene rubber D is 30% or more and 35% or less.

3. A hydraulic hose derived by using the hose rubber composition according to claim 1.

4. The hose rubber composition according to claim 1, wherein the rubber component consists of the acrylonitrile-butadiene rubbers A and B.

* * * * *